United States Patent [19]

Jimenez et al.

[11] Patent Number: 4,843,369

[45] Date of Patent: Jun. 27, 1989

[54] AUTO BRAKE LIGHT

[76] Inventors: Francisco G. Jimenez, G.P.O. Box 4805, San Juan, P.R. 00936; George Spector, 233 Broadway RM 3815, New York, N.Y. 10007

[21] Appl. No.: 150,841

[22] Filed: Feb. 1, 1988

[51] Int. Cl.$^4$ .............................................. B60Q 01/00
[52] U.S. Cl. ................................... 340/479; 340/486
[58] Field of Search ................. 340/107, 135; 116/202, 116/278, 322, DIG. 20, DIG. 39; 40/524, 528, 362, 367, 366, 518

[56] References Cited

U.S. PATENT DOCUMENTS 3,226,707 12/1965 Newman et al. .................... 340/107
3,747,246 7/1973 Sarier et al. ........................ 40/518
4,741,118 5/1988 Aiken et al. ........................ 40/518

FOREIGN PATENT DOCUMENTS 2754628 6/1979 Fed. Rep. of Germany ...... 340/107
2546458 11/1984 France ................................ 340/107
0051636 4/1977 Japan .................................. 340/107

Primary Examiner—Joseph A. Orsino, Jr.
Assistant Examiner—A. H. Chau

[57] ABSTRACT

An auxiliary brake light for a motor vehicle is provided and is located on the rear shelf behind the rear windshield of the motor vehicle and has changeable indicia therein for indicating various information when the braking system is activated.

1 Claim, 1 Drawing Sheet

AUTO BRAKE LIGHT

BACKGROUND OF THE INVENTION

The instant invention relates generally to motor vehicle signal lights and more specifically it relates to an auxiliary brake light for a motor vehicle.

Numerous motor vehicle signal lights have been provided in prior art that are adapted to certain indicia thereon for indicating a particular condition when the signal lights are activated. For example, U.S. Pat. Nos. 2,758,401; 2,878,462 and 3,491,336 all are illustrative of such prior art. While these units may be suitable for the particular purpose to which they address, they would not be as suitable for the purposes of the present invention as heretofore described.

SUMMARY OF THE INVENTION

A primary object of the present invention is to provide an auxiliary brake light for a motor vehicle that will overcome the shortcomings of the prior art devices.

Another object is to provide an auxiliary brake light for a motor vehicle that is located on the rear shelf behind the rear windshield and having changeable indicia therein for indicating various information when the brake system is activated.

An additional object is to provide an auxiliary brake light whereby the indicia that's on a sign belt can be changed by a motor moving the belt from within the motor vehicle or by manual operation of the sign belt.

A further object is to provide an auxiliary brake light for a motor vehicle that is simple and easy to use.

A still further object is to provide an auxiliary brake light for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
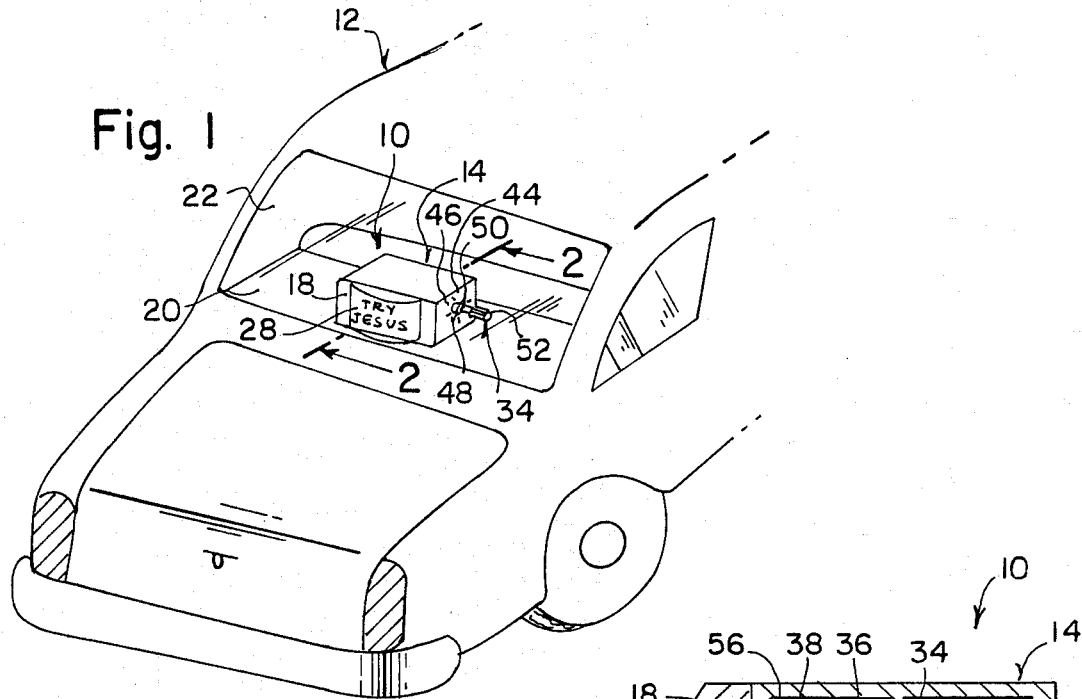
FIG. 1 is a perspective view of the rear portion of a motor vehicle showing the invention mounted to rear shelf behind the rear windshield.
Figure 2:
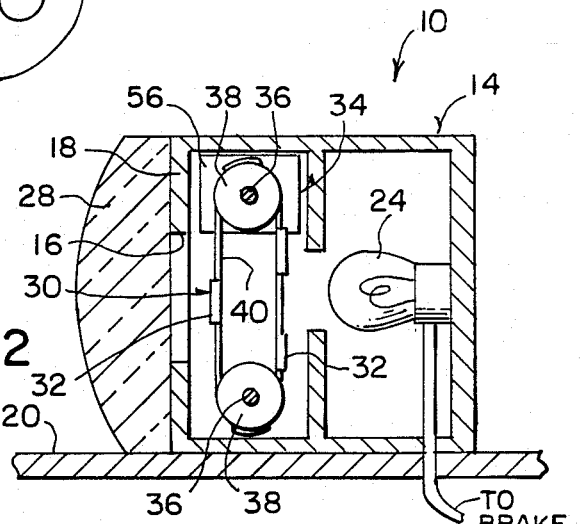
FIG. 2 is an enlarged cross sectional view taken along line 2—2 in FIG. 1, showing the internal mechanism of the auxiliary brake light.
Figure 3:
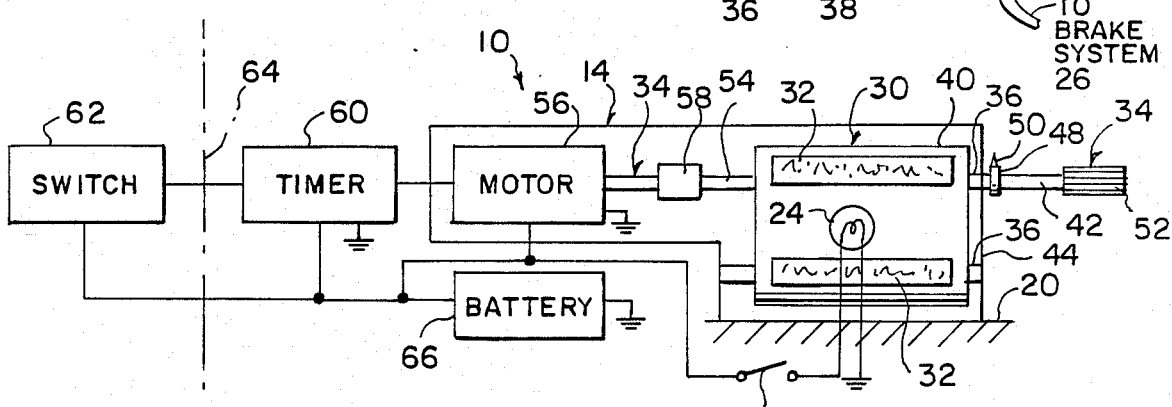
FIG. 3 is block diagram of the electrical circuit thereof.

Turning now descriptively to the drawings, in which similar reference characters denote similar elements throughout the several views, FIGS. 1 through 3 illustrates an auxiliary brake light 10 for a motor vehicle 12 consisting of a housing 14 that has a light transmitting front opening 16 in its front wall 18. The housing 14 is disposed on a rear shelf 20 behind rear windshield 22 of the motor vehicle 12. The motor vehicle can be of any model including a hatch back type. A light source 24, such as a lamp, is operably disposed within the housing 14 and constructed for selective activation by a braking system 26 of the motor vehicle 12. The light source 24 is in light communication with the front opening 16. A magnification lens 28 is integral with the housing 14 for covering the front opening 16.

A sign belt assembly 30 is provided having a plurality of indicia panels 32 thereon with each of the indicia panels permitting passage of light rays therethrough. The sign belt assembly 30 is rotatably supported in the housing 14 between the light source 24 and the magnification lens 28. A device 34 is also provided for rotating the sign belt assembly 30 for allowing one of the indicia panels 32 to be in alignment between the light source 24 and the magnification lens 28 so that the indicia panel 32 can be viewed from rear of the motor vehicle 12.

The sign belt assembly 30 includes a pair of shafts 36 vertically spaced apart and rotatably supported in the housing 14. A pair of pullies 38 are each secured onto one of the shafts 36. A continuous transparent belt 40 has each of the indicia panels 32 affixed thereto in spaced relationship, extends around the pullies 38.

The rotating device 34 includes the upper shaft 36 of the sign belt assembly 30 having a first extension segment 42 extending outwardly from one side 44 of the housing 14. A plurality of setting marks 46 are radially placed on the side 44 of the housing 14 around the first extension segment 42. A collar 48 that has a pointer 50 thereon is affixed onto the first extension segment 42 adjacent the setting marks 46. A control knob 52 is affixed to distal end of the first extension segment, whereby the control knob 52 can be manually operated allowing for moving one of the indicia panels 32 on the transparent belt 40 to a position in alignment between the light source 24 and the magnification lens 28 as indicated by placing the pointer 50 of the collar 48 to one of the setting marks 46 on the housing 14.

The rotating device 34 further includes the upper shaft 36 of the sign belt assembly 30 having a second extension segment 54 extending inwardly into the housing 14. An electric motor 56 is provided for automatically driving the second extension segment 54 of the upper shaft 36 and preselectively moving each of the indicia panels 32 on the transparent belt 40 to a position in alignment between the light source 24 and the magnification lens 28. A clutch mechanism 58 is disposed between the electric motor 56 and the transparent belt 40 on the second extension segment 54 of the upper shaft 36 for disengaging the electric motor 56 when wanting to manually operate the transparent belt 40.

As shown in FIG. 3, the motor 56 is electrically connected to a timer 60, a control switch 62 on dashboard 64 of the motor vehicle 12 and a battery 66. The motor 56 can be directly connected to the battery 66 or through a cigarette lighter (not shown)

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An auxiliary brake light for a motor vehicle which comprises:

(a) a housing having a light transmitting front opening in its front wall, said housing disposed on a rear shelf behind rear windshield of the motor vehicle;

(b) a light source operably disposed within said housing and constructed for selective activation by a braking system of the motor vehicle, said light source being in alignment with said front opening;

(c) a magnification lens integral with said housing for covering said front opening;

(d) a sign belt assembly having a plurality of indicia panels thereon with each of said indicia panels permitting passage of light rays therethrough, said sign belt assembly rotatably supported in said housing between said light source and said magnification lens; and (e) means for rotating said sign belt assembly for allowing one of said indicia panels to be in alignment between said light source and said magnification lens so that said indicia panel can be viewed from the rear of the motor vehicle; wherein said sign belt assembly includes:

(a) upper and lower shafts vertically spaced apart and rotatably supported in said housing;

(b) a pair of pulleys each secured onto one of said shafts; and (c) a continuous transparent belt having each of said indicia panels affixed thereto in spaced relationship and extending around said pullies; wherein said rotating means includes:

(a) said upper shaft of said sign belt assembly having a first extension segment extending outwardly from one side of said housing;

(b) a plurality of setting marks radially placed on the side of said housing around said first extension segment;

(c) a collar having a pointer thereon, said collar affixed onto said first extension segment adjacent said setting marks; and (d) a control know affixed to distal end of said first extension segment whereby said control knob can be manually operated allowing for moving one of said indicia panels on said transparent belt to a position in alignment between said light source and said magnification lens as indicated by placing the pointer of said collar to one of said setting marks on said housing; wherein said rotating means further includes:

(a) said upper shaft of said sign belt assembly having a second extension segment extending inwardly into said housing;

(b) an electric motor for automatically driving said second extension segment of said upper shaft and preselectively moving each of said indicia panels on said transparent belt to a position in alignment between said light source and said magnification lens; and (c) a clutch mechanism disposed between said electric motor and said transparent belt on said second extension segment of said upper shaft for disengaging said electric motor when wanting to manually operate said transparent belt.

* * * * *